127,418

UNITED STATES PATENT OFFICE.

WILLIAM H. KEYT, OF MADISON, INDIANA.

IMPROVEMENT IN THE MANUFACTURE OF GLUCOSE.

Specification forming part of Letters Patent No. 127,418, dated June 4, 1872.

*To all whom it may concern:*

Be it known that I, WILLIAM H. KEYT, of the city of Madison, Jefferson county, State of Indiana, have invented a new and useful Mode for the Manufacture of Pure Table-Sirup or Maltine from cereals or other substances of like chemical properties; and I hereby give a description of my process in true, full, and exact terms, and such as will enable any one skilled in the art to use my process and to produce a fine table-sirup.

For my process I use starch made from corn, wheat, potatoes, and like usual substances, from which starch is made.

First, the starch I make in the usual manner, (except that I employ no chemicals in its production.) The grain is steeped in warm water for a period usually of about seven days, the water being renewed each day. The grain is then ground in water, and the whole mass placed upon fine sieves and copious fine streams of water thrown upon it, thus separating the starch from the enamel of the grain, and most of the gluten and other light matter. The starch in liquid form is then run upon slightly inclined tables prepared for the purpose, and thoroughly washed with water, which frees and eliminates, and carries off in its flow remaining gluten and light matter, leaving the starch in a solid mass on the tables. Second, the starch is now taken to a wooden vessel, of any size and form convenient for the amount of starch to be handled, in which is an agitator, (a revolving rake being found suitable,) and thoroughly incorporated with pure distilled water at a temperature not much if any higher than 180° Fahrenheit, using for this purpose about ten (10) gallons of the distilled water for every one hundred pounds of starch. It is now ready for the converting-tub. Third, I first put into this tub ten gallons of pure distilled water, and one and one-quarter pounds of acid (sulphuric acid being found the best for the purpose) for every one hundred pounds of convertible matter described in the second stage of the process, thereafter to be introduced, and bring the mixture—water and acid—to the boiling-point. The convertible matter is then run into the converting-tub in a small stream, so as not to bring the temperature, during its introduction, below the boiling-point. I now continue the boiling process until the starch is fully converted into saccharine, which can be determined by the usual tests. After it is fully converted, I continue the heat for two hours, until the vegetable properties of the convertible matter are overcome, and, as I do not desire to make sugar, I do not use a greater degree of heat than about 220° Fahrenheit; and by using a pure distilled water and converting at a low temperature, I obtain what I desire—a pure neutral sweet liquor, which will not crystallize, no matter to what density it may be evaporated. Fourth, the sweet water is now run into vessel No. 3, and thoroughly incorporated with sulphate of lime, using about one and one-quarter pounds of lime for every pound of acid, or if the neutralization is not perfect, more of lime is added, until the litmus paper shows the neutralization complete. I now run the sweet water into a vessel to precipitate the lime and other matter.

The proportions stated in these specifications may be somewhat varied without substantially changing the process or the result; and slight changes may be made with reference to the toughness of the enamel, and to other qualities of the grain.

My precipitating-vessels being my own invention, I describe as follows: They are made of wood of about the following dimensions—ten feet at the bottom and five feet high, but may be varied to suit the convenience of the operator. In the bottom of this vessel I place pipe, running transversely, of copper or other suitable material, and I have found in a vessel of the size described, some two hundred feet of one and one-half inch copper pipe to produce the best result. Into this pipe I introduce steam, and by keeping the temperature 180° Fahrenheit, I prevent acidity and promote the precipitation. A perfect precipitation is thus obtained, and by no other process of which I have any knowledge. After some six hours the liquor will be found perfectly clear. It is then drawn off and run into a boiling-vessel and boiled to a density of about 16° Baumé. It is then run into double bag or other filters, (the bag filters being the best.) After this bag filtration it is again boiled to a density of about 22° Baumé. Slight variations, the work being well done, will not substantially change the result. The liquor is then discharged into an animal-coal filter from which it is discharged into the last boiling-vessel, and reduced to any required gravity, thus giving a pure table-sirup, closely resembling in flavor the sirup made from the sugar-maple.

My converting-tub is made of wood strongly hooped with iron, and of about the following dimensions—eight feet at the bottom and seven feet at the top, and sixteen feet high, having a tight bottom and top. There is an aperture in the top about eight inches in diameter, with a flue out of the building in order to convey off the steam that is generated during the process of converting. The steam for boiling I introduce by a copper pipe passing around and on the outside of the tub, and entering at two opposite points about four inches above the bottom. The pipes are inserted far enough to discharge the steam into the liquor, yet not to come in contact with it.

Having now described the nature of my invention and the method of its use, I hereby declare that what I claim, and desire to secure by Letters Patent, is—

1. The process herein described—viz., the use of distilled water and acid at the temperature and in about the proportions specified—for the conversion of starchy matter into glucose.

2. The process herein described of clarifying the sirup—viz., retaining the sirup at or about 180° Fahrenheit in the settling-vat and before filtration—in the manner and for the purpose set forth.

WILLIAM H. KEYT.

Signed in presence of—
  HENRY MORTEN,
  W. S. SCARBOROUGH.